(12) United States Patent
Stählin

(10) Patent No.: US 11,525,687 B2
(45) Date of Patent: Dec. 13, 2022

(54) METHOD FOR DETERMINING CORRECTION VALUES, METHOD FOR DETERMINING A POSITION OF A MOTOR VEHICLE

(71) Applicant: Continental Teves AG & Co. oHG, Frankfurt (DE)

(72) Inventor: Ulrich Stählin, Oakland Township, MI (US)

(73) Assignee: Continental Teves AG & Co. OHG, Frankfurt (DE)

( * ) Notice: Subject to any disclaimer, the term of this patent is extended or adjusted under 35 U.S.C. 154(b) by 0 days.

(21) Appl. No.: 16/892,852

(22) Filed: Jun. 4, 2020

(65) Prior Publication Data

US 2020/0300636 A1 Sep. 24, 2020

Related U.S. Application Data

(63) Continuation of application No. PCT/EP2018/079541, filed on Oct. 29, 2018.

(30) Foreign Application Priority Data

Dec. 8, 2017 (DE) ...................... 10 2017 222 290.5

(51) Int. Cl.
| | | |
|---|---|---|
| *G01C 21/28* | (2006.01) | |
| *G01C 21/04* | (2006.01) | |
| *G01C 21/16* | (2006.01) | |
| *G01C 25/00* | (2006.01) | |
| *G01S 19/49* | (2010.01) | |

(52) U.S. Cl.
CPC ............. *G01C 21/28* (2013.01); *G01C 21/04* (2013.01); *G01C 21/165* (2013.01); *G01C 25/00* (2013.01); *G01S 19/49* (2013.01)

(58) Field of Classification Search
CPC ...... G01C 21/28; G01C 21/04; G01C 21/165; G01C 25/00; G01S 19/49
See application file for complete search history.

(56) References Cited

U.S. PATENT DOCUMENTS

| | | |
|---|---|---|
| 6,253,154 B1 | 6/2001 | Oshizawa et al. |
| 2007/0010940 A1 | 1/2007 | Tan et al. |
| 2018/0203128 A1 | 7/2018 | Steinhardt |

FOREIGN PATENT DOCUMENTS

| | | | |
|---|---|---|---|
| CN | 102045122 B | * | 6/2013 |
| DE | 102007058193 A1 | | 6/2009 |
| DE | 102012216215 A1 | | 3/2013 |
| DE | 102013016243 A1 | | 7/2014 |

(Continued)

OTHER PUBLICATIONS

English Translation of CN-102045122-B.*

(Continued)

*Primary Examiner* — Jess Whittington
*Assistant Examiner* — Shahira Baajour

(57) ABSTRACT

The disclosure relates to a method for determining correction values for a number of sensors of a traveling motor vehicle. The method being based on backward calculation. The disclosure further relates to a method for determining a position of a motor vehicle, using the correction values. The disclosure also relates to an associated electronic control device and to an associated non-volatile computer-readable storage medium.

4 Claims, 1 Drawing Sheet

(56) References Cited

FOREIGN PATENT DOCUMENTS

| | | |
|---|---|---|
| EP | 1087209 A2 | 3/2001 |
| WO | 9849580 | 3/2001 |
| WO | 2012033807 A1 | 3/2012 |
| WO | 2013037844 A2 | 3/2013 |

OTHER PUBLICATIONS

English Translation of Bode et al.*
International Search Report and Written Opinion dated Feb. 7, 2019 from corresponding International Patent Application No. 10 2017 222 290.5.
German Search Report dated Apr. 16, 2018 for corresponding German Patent Application No. 10 2017 222 290.5.
International Search Report and Written Opinion dated Dec. 15, 2015 from corresponding International patent application No. PCT/EP2015/071100.
Search Report dated Sep. 19, 2016 from corresponding German patent application No. 10 2015 217 626.6.

* cited by examiner

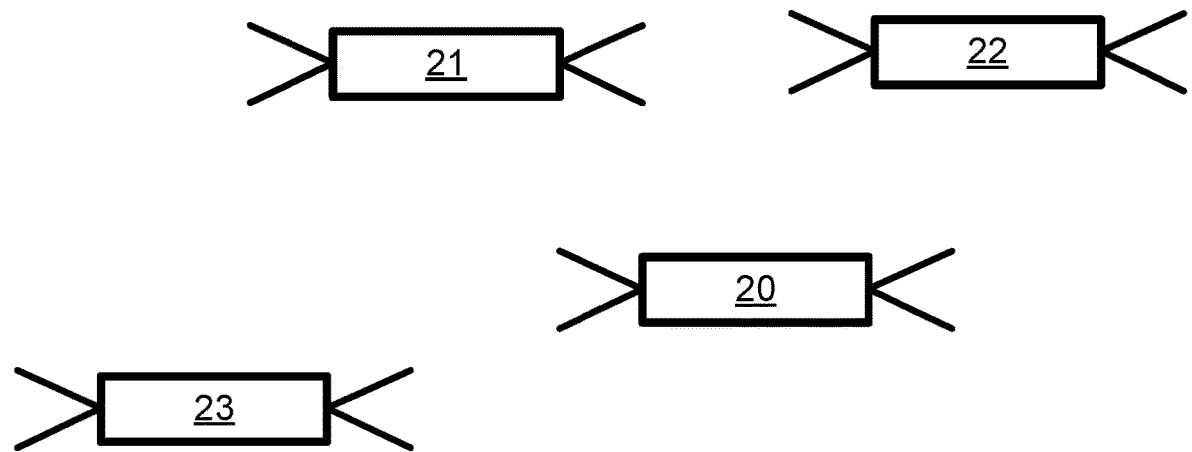
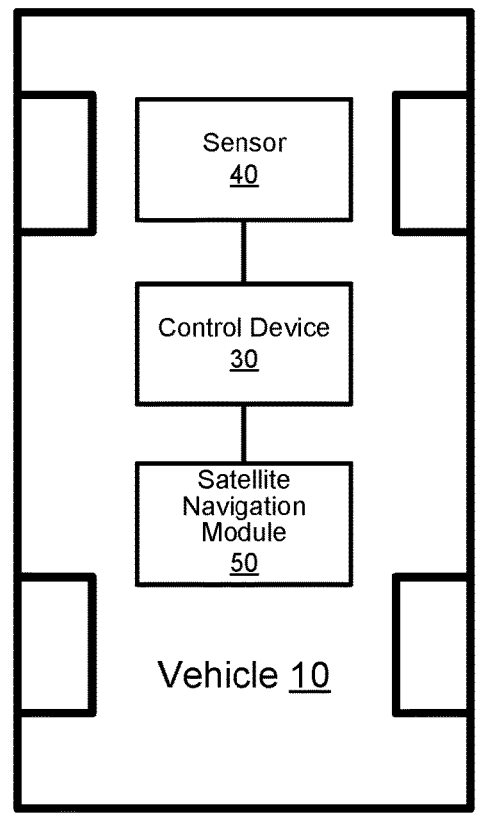

METHOD FOR DETERMINING CORRECTION VALUES, METHOD FOR DETERMINING A POSITION OF A MOTOR VEHICLE

CROSS-REFERENCE TO RELATED APPLICATIONS

This application claims the benefit of PCT Application PCT/EP2018/079541, filed Oct. 29, 2018, which claims priority to German Application DE 10 2017 222 290.5, filed Dec. 8, 2017. The disclosures of the above applications are incorporated herein by reference.

TECHNICAL FIELD

The disclosure relates to a method for determining correction values for a number of sensors of a traveling motor vehicle, a method for determining a position of a motor vehicle at a determination time, an associated electronic control device and an associated storage medium.

BACKGROUND

In order to determine the position of a motor vehicle, procedures are for example known which are based on odometry and/or on a fusion of satellite navigation (GNSS=Global Navigation Satellite System) and vehicle dynamics sensors. There are, for example, so-called loosely coupled and tightly coupled approaches. During the determination of a position or localization on the basis of satellite navigation, a good level in terms of accuracy has already been achieved in the last few years. However, situations with poor, disturbed or no satellite reception at all continue to cause problems. Examples of these are street canyons, tunnels or parking garages. Especially at tunnel exits, where satellite reception suddenly resumes, it typically takes time to compensate for an error in a localization fusion due to a lack of support by satellite navigation.

In particular it has been shown that correction values for sensors of a motor vehicle, which are typically included in a determination of a position, adopt unsuitable values during a downtime and can only be correctly calculated again after too long a period of time.

SUMMARY

The disclosure provides a method for determining correction values for a number of sensors of a traveling motor vehicle, which is alternatively or better executed in terms of this. The disclosure also provides a method for determining a position of a motor vehicle at a determination time in which corresponding correction values are included. Additionally, the disclosure provides an electronic control device and a non-volatile computer-readable storage medium for performing such methods.

One aspect of the disclosure provides a method for determining correction values for a number of sensors of a traveling motor vehicle. The method has the following steps: establishing a first position of the motor vehicle at a first time; recording sensor data of the sensors between the first time and a second time; and establishing a second position of the motor vehicle at the second time. The method also includes the following steps: calculating a retrodiction of the first position based on the second position and the recorded sensor data; and comparing the retrodiction of the first position with the first position and, based thereon, calculating the correction values.

The method is based in particular on the fact that it has been recognized that not only forward calculation, but also backward calculation can be advantageously used to calculate the correction values and, in some cases, supplies better and/or faster results than forward calculation.

Implementations of the disclosure may include one or more of the following optional features. In some implementations, the second time lies after the first time.

In some implementations, a respective correction value can indicate an error correction of a respective sensor. The errors can, for example, be static errors and/or dynamic errors. Static errors are typically those that do not change or only change slightly during a lifetime of a sensor and/or during a journey. Dynamic errors are typically those that change in a relevant way during a typical journey of a motor vehicle.

In some examples, the sensors can at least partially be selected from the following group: steering angle sensors, steering wheel angle sensors, turning rate sensors, speed sensors, acceleration sensors, wheel speed sensors, vehicle dynamics sensors, environment sensors. In the case of such sensors, the use of the method described herein has proven to be particularly advantageous. However, other sensors can also be used accordingly. Any combinations or sub-combinations of the group can also be used or can be combined with other sensors.

In some implementations, the first position and/or the second position is/are determined by a satellite navigation and/or by terrestrial bearing. This has turned out to be one possible way of determining a position quickly and efficiently. However, other methods may also be used. All methods for determining a position may also be combined with one another in order to achieve an even more accurate result in each case.

In some implementations, the method additionally includes the following steps: calculating a forecast of the second position based on the first position and the recorded sensor data; comparing the forecast of the second position with the second position; and, based thereon, calculating further correction values.

This makes it possible to combine the backward calculation described above with forward calculation. In other words, the steps provided according to the method may also be combined with known steps which are based on a forecast or respectively forward calculation. This can contribute to yet another improvement of the accuracy.

Definitive correction values may be calculated as respective averages between the correction values and the further correction values. The averages may be weighted averages, where the correction values and the further correction values are weighted in accordance with a respective accuracy. This has turned out to be a particularly precise procedure when calculating correction values based on forward and backward calculation.

In some implementations, the method is executed in response to the fact that another way of determining the correction values only supplies an accuracy below a threshold value. As a result, the necessary computational resources for the execution of the method can be used elsewhere, as long as the accuracy by another type of calculation is sufficient. The accuracy may be measured with a suitable measure.

The other way of determining the correction values may be based on a forecast of a position. This corresponds, for example, to a procedure known from the prior art. The procedure in accordance with the method according to the disclosure is switched on or alternatively used if the known procedure no longer supplies the desired accuracy.

Another aspect of the disclosure provides a method for determining a position of a motor vehicle at a determination time The method includes the following steps: establishing a starting position at a starting time which lies before the determination time; and recording sensor data of sensors of the motor vehicle between the starting time and the determination time. The method also includes correcting the sensor data with correction values, further correction values and/or definitive correction values which have been determined by means of a method according to the disclosure; and calculating the position based on the starting position and the corrected sensor data.

The very high accuracy during the calculation of correction values, which the method according to the disclosure described above makes possible, can be advantageously utilized for the use of the determination of the position of a motor vehicle by this method. The advantages explained above apply accordingly. Consequently, the motor vehicle finds its position more quickly, in critical situations such as, for example, at tunnel exits when satellite signals are suddenly available again.

With respect to the method for determining the correction values according to the disclosure, recourse can be had to all of the implementations and examples described herein.

The starting position may be established by satellite navigation and/or terrestrial bearing.

The second time can in particular correspond to the starting time. This makes possible an advantageous synchronization between the times used. For example, correction values which have just been calculated therewith are available for the further calculation of the position.

The disclosure further relates to an electronic control device which is configured to execute a method according to the disclosure. With respect to the method according to the disclosure, recourse can be had to all of the embodiments and variants described herein.

The disclosure further relates to a non-volatile computer-readable storage medium on which program code is stored; when said program code is run, a processor executes a method according to the disclosure. In terms of the method according to the disclosure, recourse can also be had to all of the embodiments and variants described herein.

Known algorithms typically calculate a new position by forward calculation. This means that data from the past are utilized in order to extrapolate future data. In other words, the data D(t+dt) can be extrapolated, for example, from data D(t), t indicating a time.

The data of a satellite navigation system and possibly other sensors such as, for example, wheel speed sensors, steering angle sensors, steering wheel angle sensors, turning rate sensors or acceleration sensors are, for example, simultaneously stored in each case in a specific period of time t. Backward calculation can then be performed in each case at the end of said time T. During backward calculation, the data can, for example, be utilized in each case in order to compute data from the past. This means that the data D(t−dt) are calculated with the data D(t). The results of such backward calculation can, for example, be compared with the data of the forward calculation and thus a correction can be performed. This correction is, in particular, the calculation of correction values for sensors. For example, an averaging, such as a weighted averaging, can be used for correction, any weightings being specified on the basis of the accuracies or integrity measures established with the forward or respectively backward calculation. The result of such a correction may be used, for example, as starting values for "normal" forward calculation in the subsequent time steps. The block calculation described can also be replaced by a sliding window approach. This can, for example, mean that at each point in time both forward and backward calculation are performed, for example on the basis of the stored data in the time window T, and a correction of the forward calculation is performed with the backward calculation, for example, at each point in time.

Instead of a cyclically repeated backward calculation, the latter can also be triggered by large inaccuracies in the forward calculation. That is to say, backward calculation can, for example, be started if the inaccuracy is very high and it can therefore be expected that other strategies can bring advantages. This backward calculation then sensibly replaces the result of the forward calculation, if the backward calculation estimates a better accuracy, or averaging takes place again, such as a weighted averaging.

Due to the combination of forward and backward calculation for the localization, the accuracy, especially in critical situations such as, for example, at tunnel exits can be increased, without changes to the sensor technology being necessary.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 1 shows a motor vehicle 10 which is configured to execute a method according to the disclosure according to an exemplary embodiment.

Like reference symbols in the various drawings indicate like elements.

DETAILED DESCRIPTION

In some implementations, a motor vehicle 10 is moving in the usual way on the Earth's surface. Four satellites 20, 21, 22, 23 are further shown purely schematically, which emit satellite navigation signals in the known way. The motor vehicle 10 is represented here purely schematically.

The motor vehicle 10 includes an electronic control device 30. The motor vehicle 10 additionally includes a sensor 40 which is only represented here by way of example and schematically, which may be a turning rate sensor. The motor vehicle 10 also includes a satellite navigation module 50 which is configured to receive the satellite navigation signals of the satellites 20, 21, 22, 23 and, based thereon, to calculate a position of the motor vehicle 10.

The control device 30, the sensor 40 and the satellite navigation module 50 are connected to one another in data terms, as shown, so that they can exchange respective values.

During the normal operation of the motor vehicle 10, positions are reported at regular intervals of time by the satellite navigation module 50 to the control device 30. However, this determination of the position is not sufficient for many applications. Therefore, odometry is additionally used, sensor data of the sensor 40 and also further sensors being continuously captured and intermediate positions between the positions reported by the satellite navigation module 50 being calculated. To this end, forward calculation is made based on the last existing satellite-determined position in each case by odometry. When a new position is available again, which has been determined by the satellite navigation, the position calculated by the odometry and the position determined by the satellite navigation are compared to one another and a deviation is ascertained. Based on this deviation, a correction value of the sensor 40 is calculated, which reproduces static and dynamic errors and which can be used for the further odometry.

It has now been shown that, in some cases, this type of calculation of correction values is too inaccurate. This is, for example, the case when the motor vehicle 10 exits from a tunnel, in which there was no satellite reception. In this case, the control device 30 detects that the accuracy is below a threshold, and a further determination of correction values is switched on, which is based on backward calculation. To this end, a retrodiction of a previous position is calculated in each case starting from a position determined by satellite navigation by odometry, and this retrodiction is then compared with a position which has previously been determined by satellite navigation. Based thereon, a correction value for the sensor 40 is calculated, which is then averaged in accordance with its estimated accuracy and an accuracy estimated during forward calculation, weighted with a correction value obtained from forward calculation. As a result, a definitive correction value is obtained, which is available for the further odometry and is more accurate than if this had only been calculated by forward calculation. This makes it possible, for example, at tunnel exits or in other situations in which satellite reception is suddenly available again, to return to a reliable odometry more quickly.

It is understood that the sensor 40 shown here simply schematically represents a plurality of possible sensors to which the method according to the disclosure can be applied.

The indicated steps of the method according to the disclosure can be executed in the indicated order. They can, however, also be executed in another order. The method according to the disclosure may be executed in one of its embodiments, for example with a specific combination of steps, such that no further steps are executed. However, further steps can essentially also be executed, including those which are not indicated.

The claims which form part of the application do not constitute a waiver of the attainment of more extensive protection.

If in the course of the proceedings it transpires that a feature or a group of features is not absolutely necessary, then the applicant here and now seeks a wording of at least one independent claim, no longer comprising the feature or the group of features.

This may, for example, involve a sub-combination of a claim existing as at the application date or a sub-combination of a claim existing as at the application date restricted by further features. Such claims or combinations of features, which are to be newly worded, are understood to also be covered by the disclosure of this application.

It is further pointed out that configurations, features and variants of the disclosure which are described in the various embodiments or exemplary embodiments and/or shown in the figures, can be combined with one another as desired. Individual or multiple features are interchangeable as desired. Resulting combinations of features are understood to also be covered by the disclosure of this application.

Back references in dependent claims should not be construed as a waiver of the right to independent, objective protection for the features of the subclaims referred back to. These features can also be used in any combination with other features.

Features which are only disclosed in the description or features which are disclosed in the description or a claim only in conjunction with other features can, in principle, be of independent inventive relevance. They can therefore also be included separately in claims to distinguish from the prior art.

A number of implementations have been described. Nevertheless, it will be understood that various modifications may be made without departing from the spirit and scope of the disclosure. Accordingly, other implementations are within the scope of the following claims.

What is claimed is:

1. A method of determining a position of a motor vehicle via backward calculation, the method comprising:
    determining a first position of the motor vehicle at a first time by satellite navigation;
    recording between the first time and a second time sensor data of a sensor for determining the position of the vehicle, wherein the second time is later in time than the first time;
    determining a second position of the motor vehicle at the second time by satellite navigation;
    calculating a backwardly calculated value of the first position based on the second position and the sensor data recorded between the first time and the second time;
    determining a deviation between the backwardly calculated value of the first position and the first position;
    calculating a backward correction value of the sensor based on the deviation; and
    determining the position of the motor vehicle based on corrected sensor data of the sensor corrected based on the backward correction value.

2. The method of claim 1, wherein the sensor comprises at least one of: a steering angle sensor, a steering wheel angle sensor, a turning rate sensor, a speed sensor, an acceleration sensor, a wheel speed sensor, a vehicle dynamics sensor, and an environment sensor.

3. The method of claim 1, further comprising:
    calculating a forecast of the second position based on the first position and the sensor data recorded between the first time and the second time;
    determining a deviation between the forecast of the second position and the second position;
    calculating a forward correction value of the sensor based on the deviation between the forecast of the second position and the second position; and
    determining the position of the motor vehicle based on corrected sensor data of the sensor corrected based on the forward correction value and the backward correction value.

4. The method of claim 3, wherein determining the position of the motor vehicle based on the corrected sensor data of the sensor corrected based on the forward correction value and the backward correction value comprises:
    weighting the forward correction value and the backward correction value; and
    determining the position of the motor vehicle base on the weighted forward correction value and the weighted backward correction value.

* * * * *